(12) United States Patent
Boily

(10) Patent No.: US 7,146,451 B2
(45) Date of Patent: Dec. 5, 2006

(54) PCI BRIDGE AND DATA TRANSFER METHODS

(75) Inventor: Patrick Boily, Burnaby (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 11/181,843

(22) Filed: Jul. 15, 2005

(65) Prior Publication Data

US 2006/0015672 A1    Jan. 19, 2006

Related U.S. Application Data

(63) Continuation of application No. 10/180,115, filed on Jun. 27, 2002, now abandoned.

(51) Int. Cl.
*G06F 13/36* (2006.01)
*G08C 15/00* (2006.01)

(52) U.S. Cl. ............... 710/310; 710/29; 710/311

(58) Field of Classification Search ............ 710/25, 710/52, 53, 57, 310, 313; 711/149; 702/183
See application file for complete search history.

(56) References Cited

U.S. PATENT DOCUMENTS

| | | | |
|---|---|---|---|
| 5,513,376 A * | 4/1996 | Lohmeyer ............. 710/53 |
| 5,659,733 A | 8/1997 | Yamashita |
| 5,719,865 A | 2/1998 | Sato |
| 5,732,286 A * | 3/1998 | Leger ............. 710/57 |
| 5,761,533 A * | 6/1998 | Aldereguia et al. ........ 710/25 |
| 5,835,741 A * | 11/1998 | Elkhoury et al. ........ 710/310 |
| 5,873,054 A | 2/1999 | Warburton et al. |
| 5,881,254 A | 3/1999 | Corrigan et al. |
| 5,935,233 A | 8/1999 | Jeddeloh |
| 5,974,518 A | 10/1999 | Nogradi |
| 6,072,781 A | 6/2000 | Feeney et al. |
| 6,157,977 A * | 12/2000 | Sherlock et al. ........ 710/310 |
| 6,279,087 B1 | 8/2001 | Melo et al. |
| 6,298,407 B1 | 10/2001 | Davis et al. |
| 6,301,632 B1 | 10/2001 | Jaramillo |
| 6,434,674 B1 * | 8/2002 | DeWilde et al. ........ 711/149 |
| 6,442,627 B1 * | 8/2002 | Negishi et al. ........ 710/52 |
| 6,512,741 B1 | 1/2003 | Kohzuki et al. |
| 6,519,666 B1 | 2/2003 | Azevedo et al. |
| 6,556,952 B1 * | 4/2003 | Magro ............. 702/183 |
| 6,571,302 B1 | 5/2003 | DeWilde et al. |
| 6,625,683 B1 * | 9/2003 | Khan et al. ........ 710/313 |
| 6,636,927 B1 | 10/2003 | Peters et al. |
| 6,795,875 B1 | 9/2004 | Gray et al. |

\* cited by examiner

*Primary Examiner*—Christopher E. Lee
(74) *Attorney, Agent, or Firm*—Oyen Wiggs Green & Mutala LLP

(57) ABSTRACT

A bridge for interconnecting a processor to a peripheral device by way of a PCI bus may have a read buffer. The bridge autonomously requests data from the peripheral device and places received data in the read buffer. The processor reads the data from the receive buffer. The bridge may have a write buffer. The bridge accumulates data in the write buffer until a triggering event occurs. Upon the occurrence of a triggering event the bridge sends the data in the receive buffer to the peripheral device in a burst.

14 Claims, 4 Drawing Sheets

PCI BRIDGE AND DATA TRANSFER METHODS

REFERENCE TO RELATED APPLICATION

This application is a continuation of U.S. patent application Ser. No. 10/180,115 entitled "PCI Bridge and Data Transfer Methods" filed 27 Jun. 2002 now abandoned which is hereby incorporated by reference herein.

TECHNICAL FIELD

The invention relates generally to computing and specifically to transferring data across PCI interfaces.

BACKGROUND

PCI (Peripheral Component Interconnect) buses are used commonly in personal computers. PCI chipsets are readily available. PCI buses operating at 33 MHz, 66 MHz and 133 MHz are currently available. However, PCI buses are undesirably inefficient for handling bursty data transfers. In various applications there is a need to transfer a bursty data stream between components.

It is known that the efficiency with which data can be transferred across a PCI bus can be increased by sending data in long bursts. Transferring a burst of data across a PCI bus incurs some overhead. It takes a system-dependent amount of time to set up a PCI bus to make a burst transfer. After the transfer is established a DWord (32 bits) can be transferred on every PCI clock cycle. Where the data transfer is bursty it is not always possible to organize the data into long bursts for transfer across a PCI bus.

There have been efforts to improve the efficiency of data transfer by providing microprocessors which have longer word capabilities between 32 and 64 bytes. Standard compilers typically do not support these capabilities. This makes it necessary to program in assembly language to take advantage of longer word transfer capabilities.

Another way to increase the efficiency with which data is transferred across a PCI bus involves providing an external DMA component. The DMA component performs burst data transfers. However each data transfer involves overhead such as setting up source and destination pointers before the burst transfer. This is not efficient unless the bursts are long.

Davis et al., U.S. Pat. No. 6,298,407 discloses a PCI-to-PCI bridge which includes a control register. Values in the control register specify storage conditions to be met by read and write queues of the bridge.

There are many applications, including various telecommunication applications, where it would be desirable to use a PCI bus but a PCI bus cannot maintain a desired throughput due to the bursty nature of the data being transmitted.

SUMMARY OF THE INVENTION

This invention provides apparatus and methods for transferring data between a processor and a peripheral device across a data bus. The data bus comprises a PCI bus in many embodiments of the invention.

A First aspect of the invention provides a bridge apparatus for permitting a processor to access data from at least one peripheral device. The bridge apparatus comprises a PCI bus interface; a processor interface; a read buffer accessible to a processor by way of the processor interface; and, a controller. The controller is configured to periodically request data from one or more peripheral devices by way of the PCI bus interface and to store the requested data in the read buffer for access by the processor. A processor connected by way of the processor interface can read the data from the read buffer without the need to read data from the peripheral device across the PCI interface. In some embodiments the controller is configured to autonomously request the data from the one or more peripheral devices. The controller may be configured to request the data at a rate in the range of on the order of once every hundreds of microseconds to once every tens of milliseconds. Each autonomous read cycle may comprise several bursts, each of a size for optimal transmission by the PCI protocol being used.

In some embodiments of the invention the bridge apparatus has a write buffer and the controller is configured to: receive by way of the processor interface data addressed to contiguous addresses in a peripheral device connected to the bus; accumulate the received data in the write buffer; and, send the accumulated data in one or more bursts to the peripheral device by way of the PCI bus interface upon the occurrence of one of one or more triggering events. The one or more triggering events including a receipt by way of the processor interface of data addressed to an address non-contiguous with the received data. The one or more triggering events may also include, without limitation, one or more of: the presence in the write buffer of a threshold amount of data; the passage of a specified time since an oldest data was written to the write buffer; the bridge apparatus determining by way of the processor interface that the processor is attempting to communicate with another device; the bridge apparatus receiving by way of the processor interface for transmission to a peripheral device data consisting of less than one full long word; the bridge apparatus receiving by way of the processor interface a read request, and so on.

The peripheral device may comprise an ATM traffic shaper.

Another aspect of the invention provides apparatus for permitting a processor to write data to at least one peripheral device. The apparatus comprises: a PCI bus interface; a write buffer accessible to the processor; and a controller. The controller is configured to: receive by way of the processor interface data addressed to contiguous addresses in a peripheral device accessible by way of the PCI bus interface; accumulate the received data in a write buffer; and, upon the occurrence of one of one or more triggering events, send the accumulated data to the contiguous addresses as a burst by way of the PCI bus interface. The one or more triggering events include a receipt by way of the processor interface of data addressed to an address non-contiguous with data accumulated in the write buffer.

The bridge apparatus may have a plurality of write buffers. In such cases the controller may be configured to: accumulate the received data in a first one of the plurality of write buffers; and upon receiving by way of the processor interface, the data addressed to an address non-contiguous with the received data, place the data addressed to an address non-contiguous with the received data into a second one of the plurality of write buffers.

A further aspect of the invention provides a method for transferring data across a bus. The bus may be a PCI bus. The method comprises: at a bridge connected to the bus, receiving from a processor data addressed to contiguous addresses in a peripheral device connected to the bus; accumulating the received data in a write buffer; and, sending the accumulated data to the peripheral device upon the occurrence of one of one or more triggering events, the one or more triggering events including a receipt from the processor of data addressed to a non-contiguous address.

In some embodiments the method includes: at the bridge, periodically generating requests for data from at least one peripheral device; in response to the requests for data receiving one or more bursts of data from the at least one peripheral device; and, storing the received data in a read buffer accessible to the processor.

Further aspects of the invention and features of specific embodiments of the invention are described below.

BRIEF DESCRIPTION OF THE DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

There are some applications for which, in theory, a PCI bus has enough bandwidth to be used but, in practice, the PCI bus cannot maintain a required throughput due to the inefficient way in which current PCI buses handle the transmission of data which comes in small bursts. This is true, for example, for some telecommunications applications. In the following description a telecommunication system is used to explain the operation of the invention. The invention may also be applied outside the telecommunications field.

Figure 1:
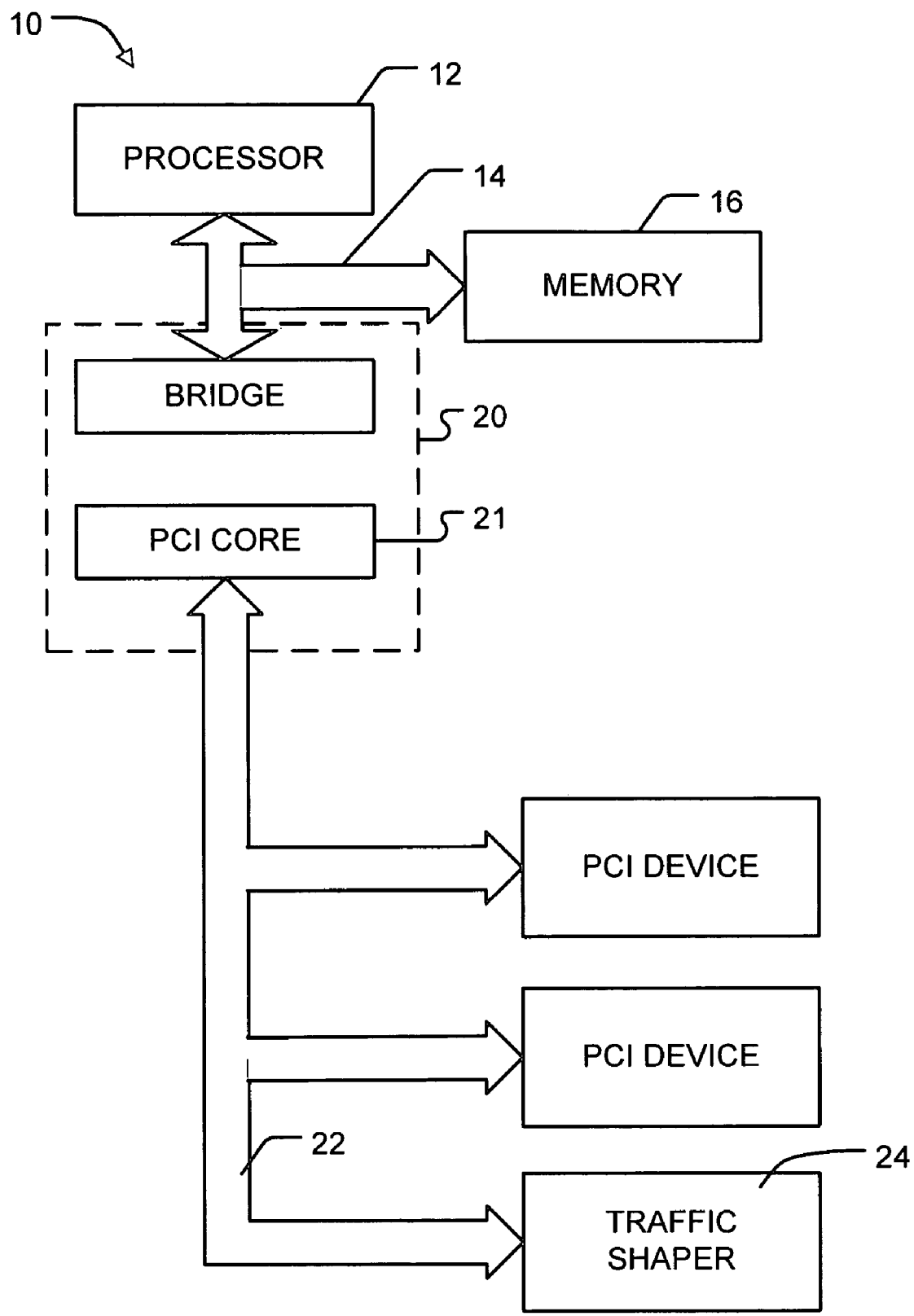
FIG. 1 is a block diagram of apparatus including a bridge according to the invention.

FIG. 1 shows a system 10 according to the invention. System 10 includes a processor 12. Processor 12 could be, for example, a Motorola™ PowerPC™ microprocessor such as a MPC8260. Processor 12 has a local bus 14 through which it can communicate with a memory 16 and with a bridge 20. Bridge 20 permits processor 12 to communicate with other parts of system 10 by way of a PCI bus 22. Bridge 20 includes PCI core 21 that interfaces to PCI bus 22. The operation of the PCI bus is described in the *PCI Local Bus Specifications* available from the PCI Special Interest Group (PCI-SIG) of Portland, Oreg. (currently at Revision 2.2) and also in Solari et al. *PCI Hardware & Software Architecture and Design* published by Annabooks ISBN 0-929392-59-0 and Shanley, *PCI System Architecture* published by Mind-Share ISBN 0-201-40993-3, all of which are incorporated herein by reference.

PCI bus 22 connects bridge 20 to one or more peripheral devices including at least one device with which processor 12 needs to communicate. In the illustrated embodiment, bridge 20 is connected to a traffic shaper 24 which shapes ATM (Asynchronous Transfer Mode) packets. The packets may comprise AAL2 (ATM Adaptation Layer 2) protocol units.

Figure 2:
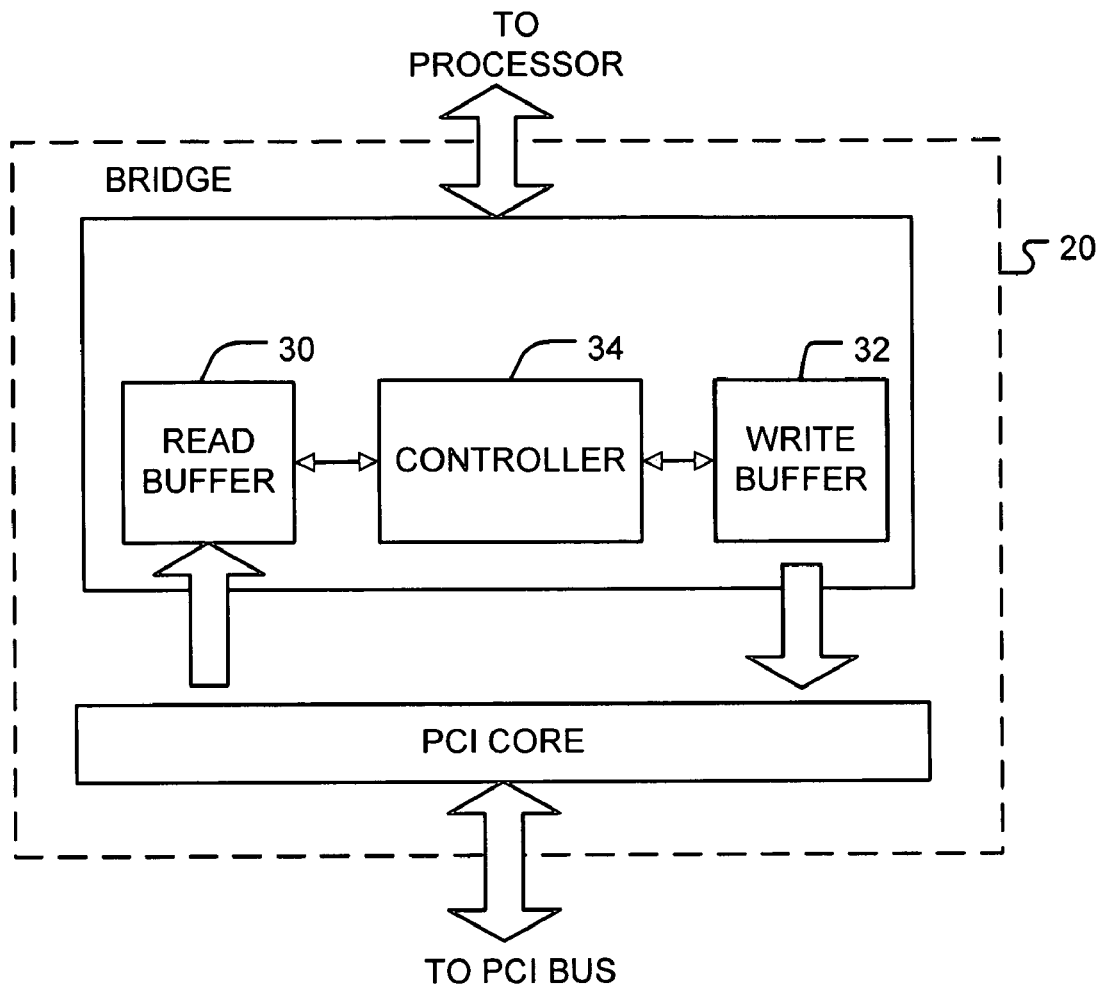
FIG. 2 is a block diagram of a bridge according to an embodiment of the invention.

As shown in FIG. 2, bridge 20 comprises a read buffer 30. Read buffer 30 improves the performance of requests by processor 12 to read data from traffic shaper 24, as described below. Bridge 20 also comprises a FIFO (First In First Out) write buffer 32 and a write buffer controller 34. Write buffer 32 and write buffer controller 34 improve the performance of requests by processor 12 to write data to devices on PCI bus 22 including traffic shaper 24.

Bridge 20 conserves bandwidth by accumulating requests from processor 12 to write data to devices on PCI bus 22 in write buffer 32. Bridge 20 sends the accumulated requests as a burst across PCI bus 22. Write buffer controller 34 causes any data in write buffer 32 to be sent upon the occurrence of specified events. These events may include:

a threshold amount of data has been accumulated in write buffer 32;
 a timeout occurs (e.g. a specified time has passed since the oldest data was written to write buffer 32);
 in cases where bridge 20 recognizes a command for the transfer of a specified quantity of data, an amount of data specified by the command is present in write buffer 32;
 processor 12 issues a read request to bridge 20;
 processor 12 attempts to write less than a full long word;
 processor 12 is communicating with another device; and,
 processor 12 directs non-contiguous data for transmission by bridge 20 (i.e. there is data accumulated in write buffer 32 and bridge 20 receives from processor 12 data for transmission to an address which is not contiguous with the addresses of the data already accumulated in write buffer 32).

Figure 3:
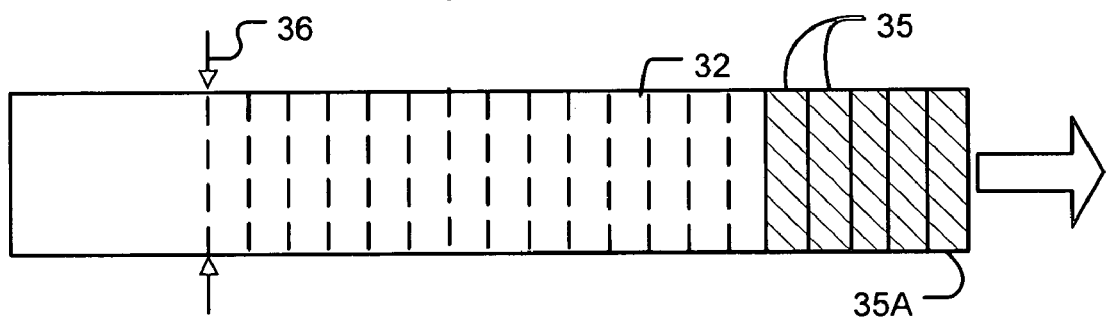
FIG. 3 is a block which schematically illustrates a write buffer in a bridge.

FIG. 3 illustrates write buffer 32 schematically. Data words 35 are added to write buffer 32 beginning with a first word 35A. Controller 34 permits additional data to be added to write buffer 32 until a trigger event occurs. the trigger event causes controller 34 to send all of the data in write buffer 32 across PCI bus 22 to its destination in a burst. Controller 34 may, for example, send all of the data in write buffer 32 when write buffer 32 contains a threshold amount of data. In FIG. 3 the threshold is indicated by arrows 36. The threshold may, for example, correspond to 64 words of data. Some PCI bus architectures are particularly efficient at transferring data in bursts of 64 long words each.

A bridge according to some preferred embodiments of the invention has a plurality of individually controlled write buffers 32. This permits data to be accumulating in one write buffer 32 while a burst of data is being sent from another write buffer 32. Each write buffer 32 may accumulate data for a single destination. Bridge 20 may have more than four write buffers 32 and may have, for example, five write buffers 32.

Figure 4A:
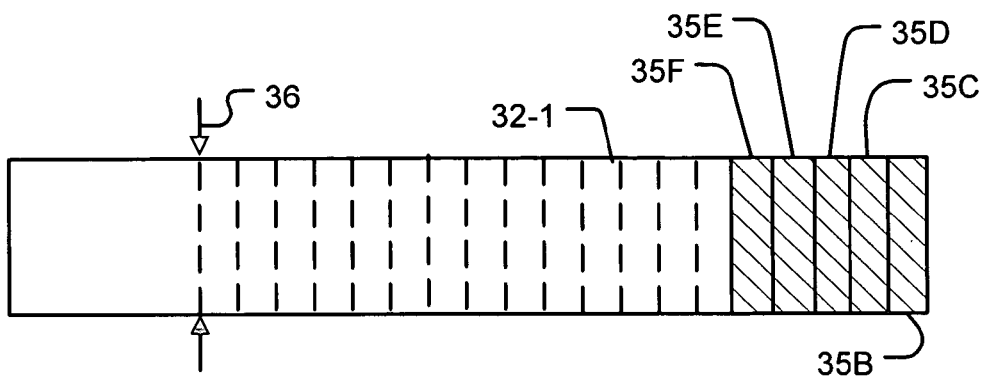
FIGS. 4A and 4B are diagrams which schematically illustrates a pair of write buffer in a bridge; and, FIG. 5 is a block diagram of apparatus including a bridge having a read buffer.
Figure 4A:
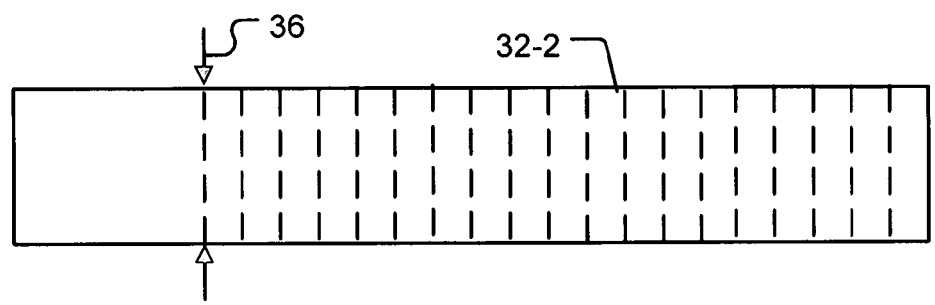
Figure 4B:
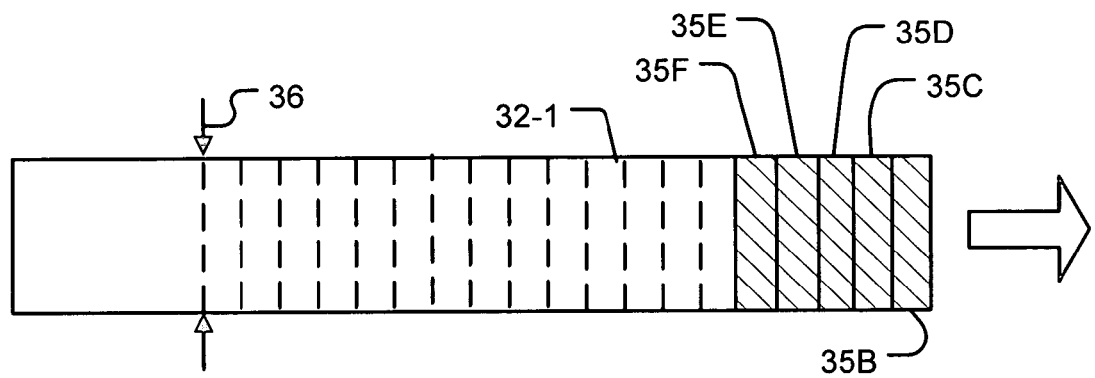
Figure 4B:
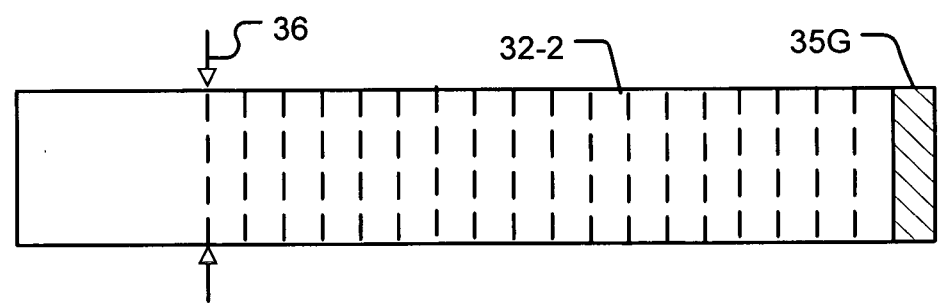

FIGS. 4A and 4B illustrates a situation in which two sets of data arrive at bridge 20 for transmission to peripheral devices on PCI bus 22. First, a data word 35B arrives at bridge 20 data word 35B is addressed to a location having an address A1. Data words 35C through 35F arrive at bridge 20. These data words are addressed to locations contiguous with A1. All of data words 35B through 35F accumulate in a first write buffer 32-1. This situation is shown in FIG. 4A. The threshold amount 36 of data for sending the data in write buffer 32-1 has not been reached.

Next, as shown in FIG. 4B, a data word 35G arrives at bridge 20. Data word 35G is addressed to an address A2, which is not contiguous with the block of addresses of words 35B through 35F. The arrival of data word 35G triggers the sending of data words 35B through 35F as a burst across PCI bus 22 to locations in a peripheral device at locations identified by the addresses A1 to A1+(N*4), where N is the number of long words contained in the buffer. Bridge 20 places data word 35G into a second write buffer 32-2 and waits for an event to trigger the transmission of data in second write buffer 32-2.

Figure 5:
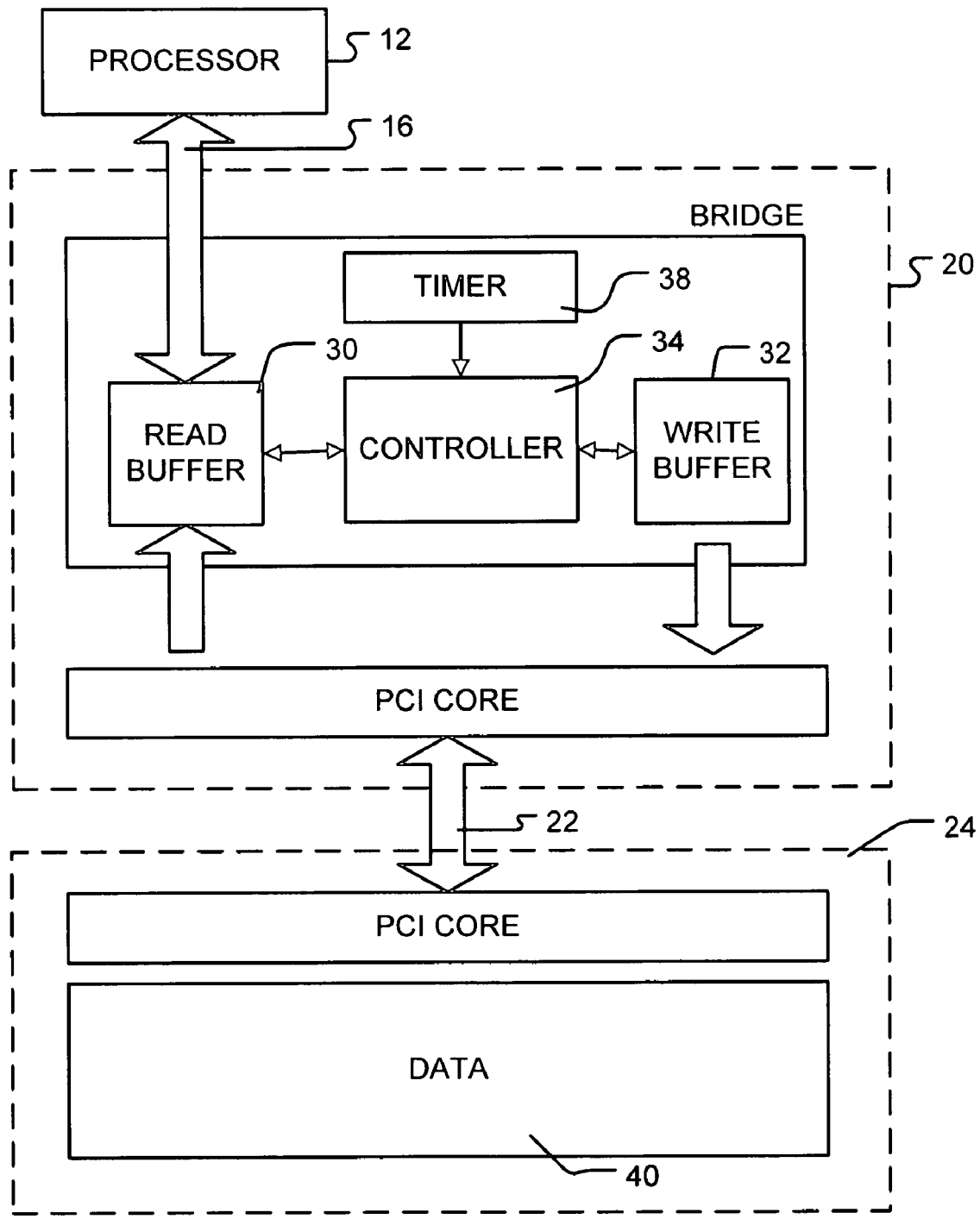

In cases where processor 12 requires periodic access to data from a device on PCI bus 22, bridge 20 may be configured with a read buffer 30. For example, FIG. 5 shows a case where traffic shaper 24 contains a block of data 40 which includes data to which processor 12 requires periodic access. Bridge 20 is configured to periodically request the data of block 40. In the illustrated embodiment, requests for data 40 are generated by controller 34 in response to time information from a timer 38. These requests are preferably generated autonomously by bridge 20 (i.e. after bridge 20 has been configured to maintain a copy of data 40 in read buffer 30, bridge 20 generates the necessary requests automatically). In some embodiments the requests are generated at a rate in the range of one request every 100 microseconds to one request every 100 milliseconds. In some embodiments the requests are generated at a rate in the range of one request every millisecond to one request every 10 milliseconds.

Requests for the data of block 40 are preferably implemented by bridge 20 writing to a control register in traffic shaper 24. These requests may be made periodically at a desired rate. For example, in some embodiments, the requests may be generated on the order of once every hundreds of microseconds to tens of milliseconds. Upon reception of the periodical requests, the controller 34, acting as an initiator, reads data from block 40 to its internal read buffer 30 across the PCI bus 22 in one or more bursts. The bursts may be chosen to have sizes which are optimal for the efficient transfer of data across PCI bus 22. The data of block 40 may be transmitted to read buffer 30 on an "opportunity" basis. Traffic shaper 24 may write the data of block 40 to read buffer 30 at a low-priority level.

Processor 12 has immediate access to data in read buffer 30 by way of local data bus 16. Read buffer 30 preferably comprises a dual port memory so that processor 12 can read data from read buffer 30 at the same time as data 40 is being written to read buffer 30.

The combination of accumulating write requests in a write buffer 32 to make more efficient use of PCI bus 22 in the write direction and providing a bridge which stores data 40 from a PCI slave device in a locally accessible read buffer 30 can provide dramatic improvements in the efficiency with which bursty data can be transmitted across a PCI bus.

Bridge 20 may be implemented in a FPGA (Field Programmable Gate Array) or custom ASIC (Application Specific Integrated Circuit). The invention may be implemented as a set of configuration instructions which cause a FPGA to be configured or an ASIC to be created to implement bridge 20. The instructions may be provided in a hardware description language (HDL) and recorded on any suitable computer-readable medium.

Certain implementations of the invention comprise computer processors which execute software instructions which cause the processors to perform a method of the invention. For example, one or more processors in a controller 34 for a bridge 20 may implement the methods of the invention by executing software instructions in a program memory accessible to the processors. The invention may also be provided in the form of a program product. The program product may comprise any medium which carries a set of computer-readable signals comprising instructions which, when executed by a computer processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like or transmission-type media such as digital or analog communication links.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An apparatus for interfacing a microprocessor to a peripheral device via a peripheral component interconnect (PCI) protocol bus, the apparatus comprising:

a first-in-first-out (FIFO) register for accumulating data units being exchanged between the microprocessor and the peripheral device; and a controller operable to:

monitor a plurality of characteristics of data units in the FIFO register;

determine whether the characteristics satisfy any of a plurality of preset criteria; and initiate transferring of the data units from the FIFO register to the peripheral device by way of the PCI protocol bus in response to any one of the plurality of preset criteria being satisfied by the characteristics of the data units in the FIFO register so that bandwidth on the PCI protocol bus is used efficiently for transferring the data units wherein the controller is configured to initiate transferring of the data units from the FIFO register to the peripheral device by way of the PCI protocol bus whenever the controller detects that the processor is attempting to communicate with another device.

2. The apparatus according to claim 1 wherein one of the preset criteria evaluates whether a particular data unit arriving for accumulation in the FIFO register is not Contiguous with other data units accumulated in the FIFO register and the controller automatically initiates transferring of the data units from the FIFO resister to the peripheral device in response to arrival of the particular data unit.

3. The apparatus according to claim 2 wherein the particular data unit has an address label that is different from address labels for the other data units.

4. The apparatus according to claim 2 wherein the FIFO register constitutes a first one of a plurality of FIFO registers wherein, the controller is configured to accumulate the received data units in the first FIFO register until receiving the particular data unit that is not contiguous to other data units accumulated in the first FIFO register and to place the particular data unit that is not contiguous to other data units accumulated in the first FIFO register into a second one of the plurality of FIFO registers.

5. The apparatus according to claim 4 wherein the plurality of FIFO registers comprises at least four FIFO registers.

6. The apparatus according to claim 1 wherein one of the preset criteria establishes a threshold for a quantity of data units accumulated in the FIFO register, the threshold is less than a capacity of the FIFO register and the controller automatically initiates transferring of the data units from the FIFO register to the peripheral device in response to the controller determining that a quantity of data units in the FIFO register at least equals the threshold.

7. The apparatus according to claim 6 wherein the threshold is sixty-four 32-bit data units.

8. The apparatus according to claim 1 wherein one of the preset criteria evaluates whether a time since a particular data unit was stored in the FIFO register exceeds a threshold and the controller automatically initiates transferring of the data units from the FIFO register to the peripheral device in response to determining that the time since the particular data unit was stored in the FIFO register exceeds the threshold.

9. The apparatus according to claim 1 wherein one of the preset criteria evaluates whether a particular data unit arriving for storage in the FIFO register consists of less than one full long word and the controller automatically initiates transferring of the data units from the FIFO register to the peripheral device in response to arrival of the particular data unit.

10. The apparatus according to claim 1 comprising a read buffer accessible to the microprocessor by way of a processor interface; wherein the controller is configured to periodically request data items by way of the PCI protocol bus from one or more peripheral devices connected to the PCI protocol bus and to store the requested data items in the read buffer for access by the processor by way of the processor interface.

11. The apparatus according to claim 10 wherein the controller is configured to periodically request the data items from the one or more peripheral devices at a rate in the range of on the order of once every hundreds of microseconds to once every tens of milliseconds.

12. The apparatus according to claim 10 wherein at least one of the peripheral devices is configured to send the data items to the read buffer across the PCI protocol bus in one or more burst mode data transfers.

13. The apparatus according to claim 12 wherein the burst mode data transfers occur at a lowest priority provided by the PCI protocol bus.

14. An apparatus for interfacing a microprocessor to a peripheral device via a peripheral component interconnect (PCI) protocol bus, the apparatus comprising:

a first-in-first-out (FIFO) register for accumulating data units being exchanged between the microprocessor and the peripheral device; and a controller operable to;

monitor a plurality of characteristics of data units in the FIFO register;

determine whether the characteristics satisfy any of a plurality of preset criteria; and initiate transferring of the datA, units from the FIFO register to the peripheral device by way of the PCI protocol bus in response to any one of the plurality of preset criteria being satisfied by the characteristics of the data units in the FIFO register so that bandwidth on the PCI protocol bus is used efficiently for transferring the data units wherein the controller is configured to initiate transferring of the data units from the FIFO register to the peripheral device by way of the PCI protocol bus whenever the controller detects a read request originating from the processor.

* * * * *